2,866,552

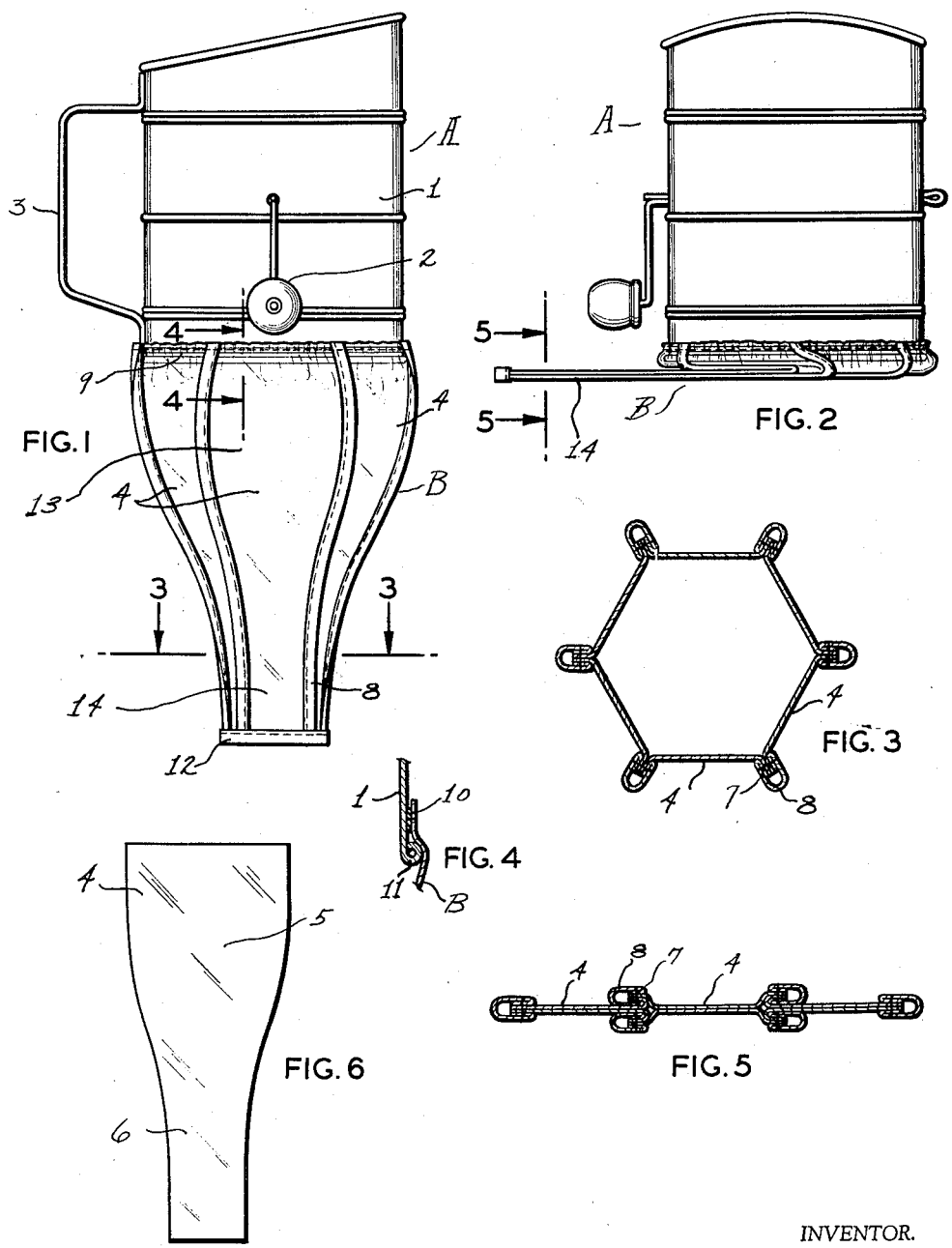
Dec. 30, 1958 — G. RICHMAN — 2,866,552
FLOUR SIFTER ACCESSORY
Filed Aug. 14, 1957
INVENTOR.
GERALDINE RICHMAN
BY Ralph W. Kalish
ATTORNEY United States Patent Office 2,866,552
Patented Dec. 30, 1958

FLOUR SIFTER ACCESSORY

Geraldine Richman, Richmond Heights, county of St. Louis, Mo.

Application August 14, 1957, Serial No. 678,094

4 Claims. (Cl. 209—255)

This invention relates in general to flour sifters and, more particularly, to an accessory adapted to provide a cover for a sifter during non-usage to prevent accidental flour loss and a dispensing nozzle during usage.

The well known, household flour sifter customarily comprises a cylindrical sheet metal body open at both ends, having a sifting screen disposed spaced y upwardly of its lower end and a rotatably mounted member for forcing flour through the screen. At times during flour sifting, the user will normally have occasion to place a sifter down, at rest, in order to free the user's hands for some other step in the particular culinary procedure at hand. In such instances some flour, from above the screen, will, through gravity, fall downwardly onto the sifter-support surface, causing uneconomical waste as well as rendering the working area disorderly. Covers for the lower ends of flour sifters to prevent such flour leakage have not heretofore been practical, as the use of the same necessitates attachment and detachment numerous times during a period of use and thus making the particular operation all the more tedious and laborious. Up to the present, there has not been devised a member for covering the lower end of a flour sifter during non-usage which upon usage of the sifter will automatically assume an opened position without the intervention of any manipulation by the user.

As the lower ends of flour sifters are of relatively extensive diameter, flour being sifted will, perforce, be distributed over a generally broad area. In many instances it is preferable that the discharged flour be directed to a specific, small area or within a receptacle of limited cross section. Means for so directing the flour as it is discharged to avoid wastage as well as to preserve the neat sightliness of the operating space is most desirable. However, efforts to provide such discharge directing means have consisted primarily of the provision of metallic funnels for securement to the lower end of the sifter. But such have proved inadequate as the flour sifter could not be set down in an upright position without danger of overturning and, additionally, such metal attachments are relatively costly. A flexible funnel made from a single section of material, weighted in its lower end, has been devised which when the flour sifter is set down is adapted to be containing'y received within the lower end of the sifter beneath the screen. This flexible member has also demonstrated inadequacy, as flour leakage during non-usage of the sifter is not in any way prevented thereby.

Therefore, it is a primary object of the present invention to provide an accessory for a flour sifter comprising a generally tubular shaped, flexible member for disposition upon the lower end of a four sifter, which is adapted to cover the said lower end during periods of non-use and to form a discharge nozzle upon elevation of the sifter into operating position.

It is a further object of the present invention to provide a flour sifter accessory of the type described which is uniquely constructed with projecting rib portions so that upon presenting the sifter in operative position the nozzle of the accessory will automatically be open for flour discharge, and hence, proof against any inadvertent closure.

It is another object of the present invention to provide a flour sifter accessory of the type stated which may be economically manufactured and which is reliable and durable in usage.

Other objects and details of the invention will be apparent from the following description, when read in connection with the accompanying drawing (one sheet) wherein:

Figure 1 is an elevation view of a flour sifter in operative position having engaged on the lower end thereof an accessory constructed in accordance with and embodying the present invention.

Figure 2 is an elevation view of a flour sifter having the accessory of the present invention engaged thereon with the sifter being presented in inoperative position, as disposed upon a support surface.

Figure 3 is a horizontal transverse section taken along the line 3—3 of Figure 1.

Figure 4 is a vertical transverse section taken on the line 4—4 of Figure 1.

Figure 5 is a vertical transverse section taken along the line 5—5 of Figure 2.

Figure 6 is a plan view of a panel of the accessory.

Referring now by reference characters to the drawing which illustrates the preferred embodiment of the present invention, A designates a customary household-type flour sifter comprising a cylindrical, preferably metal, body 1 being open at both its upper and lower ends and having internally a transversely extending sifting screen (not shown) spaced upwardly from its lower end and a movable sifting element (not shown) for forcing flour through the screen; said element being operated by a rotatably mounted hand crank 2. Said sifter A is also provided with a handle 3 for holding the same during the sifting operation.

Provided for detachable engagement upon the lower end of sifter A is an accessory B which comprises a generally tubular body being open at its upper and lower ends; said body consisting of six panels 4, each being fabricated of flexible material such as, for example, plastic sheeting, textile fabrics, or the like. Each panel 4 is enlarged in its upper portion as at 5 and curves downwardly and inwardly on its side edges to a narrow lower portion 6, with its upper and bottom edges being cut substantially parallel (see Figure 6). Adjacent panels 4 are secured together along their side edges, as by stitching, as at 7 within binding tapes 8 to form relatively strong, rib-like projections which extend from end-to-end of accessory B. The upper end margins of each panel 4 are gathered, as at 9, and secured to the outer face of an elastic band 10 for frictional engagement upon the lower end of sifter A, preferably above an end bead 11 formed thereon, for maintaining accessory B upon sifter A and permitting full suspension thereof from sifter A when the latter is presented for flour discharging operation. A binding tape portion 12 is secured about the lower ends of each of the panels 4.

It will thus be seen that accessory B will, when in depending position from sifter A, assume a generally funnel-shaped character with the upper portions 5 of panels 4 cooperating to form an enlarged flour-receiving portion as at 13 and with the narrow lower portion 6 of panel 4 cooperating to provide a discharge spout 14. The hexagonal cross section of accessory B is more pronounced in the nozzle portion 14 due to the relatively straight side edges of the lower portion 6 of each panel 4.

Accessory B has a length greater than the diameter of sifter A and is of such extent that when sifter A is in resting position, as shown in Figure 2, the entire nozzle portion 14 of accessory B, at least, will extend laterally beyond sifter A so that thus when in operative position the distance between sifter A and the commencement of the nozzle portion 14 will be greater than the diameter of said sifter.

With accessory B engaged upon sifter A and the latter held for flour discharge, said accessory B will depend full downwardly for flour flow therethrough and the lower end of nozzle portion 14 will naturally and reliably be opened without manipulation by the sifter user. The inherent opening tendency of accessory B upon being suspended from sifter A is a result of the unique hexagonal cross-sectional character of nozzle portion 14 wherein there are no extensive confronting surfaces for frictional adherence with resulting closure, and the sides of the said end are disposed with relation to each other so that through normal bias the same will move away from each other to effect the opening. Thus, during use of sifter A any concern as to the proper flow of flour through accessory B is obviated and by the restricted character of the nozzle portion 14 direction of flour into limited, predetermined areas may be easily accomplished.

When the use of sifter A is to be discontinued, as may occur frequently during a particular culinary operation, the same may be placed upon any support surface, such as a table, or the like, and in so doing accessory B will fold across the lower end of sifter A, as may best be seen in Figure 2, thereby completely closing such end so that during periods of disuse flour will not "leak" onto the support surface with attendant costly loss and resulting messiness. It will be seen that due to its length, accessory B will, in such closed, folded condition, extend, in its normally lower nozzle-forming portion laterally outwardly from sifter A. The unique construction of accessory B, with its particular length, the hexagonal cross-section with reinforcing ribs, and the relatively narrow, elongated character of its nozzle portion 14, will inherently cause it to assume such folded position when sifter A is placed in a position of rest. It will be seen that the corners of the hexagon as thus formed provide normal lines of folding so that the accessory will assume the position shown in Fig. 5. Thus the joined edges of the panels 4 together with the related rib provide what might be considered as a hinged joint, whereby any folding would, following the path of least resistance, be along the line of joinder. Furthermore, it is to be seen that to accomplish the complete closure when in folded position, the accessory should comprise an even number of panels, so that corresponding panels will be brought, at least at their lower portions, into face-to-face abutment when folded. However, it is obvious that the number of such panels could not be less than four, since two panels would not provide the desired tendency to open when the accessory is in operative position. It may be observed that when sifter A is lowered onto a support surface the lower end of nozzle 14 will first contact such surface and due to the downward force must necessarily "give" in view of the resistance of such support surface. Since nozzle 14 due to its length and cross section cannot "give" vertically, it must, perforce, be forced to one side and thereby assure proper closure of sifter A. In other words, the construction of accessory B as above described will prevent upward folding or telescoping of accessory B and conduce to its effective closing position.

Accessory B is relatively small and of exceedingly light weight so that the same when detached from sifter A will require minimum storage space and it is obvious that the same may be most economically manufactured.

It should be understood that changes and modifications in the form, construction, arrangement, and combination of the several parts of the flour sifter accessory may be made and substituted for those herein shown and described without departing from the nature and principle of the present invention.

Having thus described my invention, what I claim and desire to secure by Letters Patent is:

1. In combination with a flour sifter comprising a cylindrical body open at its upper and lower ends, a sifting screen provided in said body spacedly from the lower end thereof, an accessory for detachable engagement on the lower end of said sifter comprising a generally tubular open ended body constricted in its lower end portion, means at the upper end of said tubular body circumferentially engaged on the lower end of said sifter, said tubular body being comprised of an even number of panels of no less than four, each panel being engaged to the adjacent panel along its normally vertical side edges providing a reinforcing, projecting rib defining a line of folding whereby when said sifter is in disuse the accessory may be collapsed by folding along a pair of opposed ribs to cause corresponding panels to be brought into snug, face-to-face accessory-closing relationship, said tubular body further having a length such that the constricted lower end thereof will be spaced from the lower end of said sifter a distance greater than the diameter of said sifter when said accessory depends therefrom.

2. The combination as described in claim 1 wherein the tubular body of the accessory is comprised of six panels of flexible material, each panel being secured along its side edges to the adjacent panel in the provision of outwardly projecting rib portions.

3. The combination as described in claim 2 wherein each panel of the accessory comprises an upper wide portion and a lower portion of reduced width, the lower portions of said panels cooperating to form a relatively elongated nozzle of hexagonal cross section.

4. The combination as described in claim 3 wherein each panel is gathered at its upper end and the means for circumferentially engaging the sifter is an elastic band secured to said panels at their upper ends.

References Cited in the file of this patent

UNITED STATES PATENTS

| | | |
|---|---|---|
| 376,449 | Purefoy | Jan. 17, 1888 |
| 451,257 | Bird | Apr. 28, 1891 |
| 572,242 | Brandenberger | Dec. 1, 1896 |
| 645,956 | Hyrons | Mar. 27, 1900 |
| 2,252,701 | Copeman | Aug. 19, 1941 |
| 2,674,375 | Clay | Apr. 6, 1954 |